(12) United States Patent
Kim

(10) Patent No.: US 8,709,621 B2
(45) Date of Patent: Apr. 29, 2014

(54) RECHARGEABLE BATTERY

(75) Inventor: Jun Ho Kim, Yongin-si (KR)

(73) Assignee: Samsung SDI., Ltd., Suwon-si (KR)

(*) Notice: Subject to any disclaimer, the term of this patent is extended or adjusted under 35 U.S.C. 154(b) by 1685 days.

(21) Appl. No.: 11/380,096

(22) Filed: Apr. 25, 2006

(65) Prior Publication Data
US 2006/0251930 A1 Nov. 9, 2006

(30) Foreign Application Priority Data
May 4, 2005 (KR) .................. 10-2005-0037609

(51) Int. Cl.
*H01M 2/02* (2006.01)
*H01M 2/34* (2006.01)

(52) U.S. Cl.
USPC ................................. 429/7; 429/178

(58) Field of Classification Search
USPC ............... 429/7, 61, 174, 178, 188
See application file for complete search history.

(56) References Cited

U.S. PATENT DOCUMENTS

| | | | | |
|---|---|---|---|---|
| 2,915,730 A * | 12/1959 | Davis | | 338/309 |
| 3,953,922 A * | 5/1976 | Heim | | 29/602.1 |
| 5,376,467 A * | 12/1994 | Abe et al. | | 429/7 |
| 5,537,286 A * | 7/1996 | Gozlan et al. | | 361/106 |
| 5,814,890 A * | 9/1998 | Iwasaki | | 257/778 |
| 6,524,732 B1 * | 2/2003 | Iwaizono et al. | | 429/7 |
| 6,713,210 B1 * | 3/2004 | Sato et al. | | 429/62 |
| 7,939,191 B2 * | 5/2011 | Kim | | 429/61 |
| 8,029,926 B2 * | 10/2011 | Kim | | 429/62 |
| 2002/0142195 A1* | 10/2002 | Ehara | | 429/7 |
| 2005/0064286 A1* | 3/2005 | Kozu et al. | | 429/180 |

FOREIGN PATENT DOCUMENTS

| | | |
|---|---|---|
| JP | 2000-077831 | 3/2000 |
| JP | 2003-017026 | 1/2003 |
| JP | 2003-187785 | 7/2003 |
| JP | 2003-282038 | 10/2003 |
| JP | 2003-282039 | 10/2003 |

* cited by examiner

*Primary Examiner* — Ula C Ruddock
*Assistant Examiner* — Lisa S Park Gehrke
(74) *Attorney, Agent, or Firm* — H.C. Park & Associates, PLC

(57) ABSTRACT

A rechargeable battery includes a current interruption device that is directly coupled to the cap plate of the bare cell.

16 Claims, 3 Drawing Sheets

RECHARGEABLE BATTERY

CROSS REFERENCE TO RELATED APPLICATION

This application claims the benefit of and priority to Korean Patent Application No. 10-2005-0037609, filed on May 4, 2005, which is hereby incorporated by reference for all purposes as if fully set forth herein.

BACKGROUND OF THE INVENTION

1. Field of the Invention

The present invention relates to a rechargeable battery, and more particularly, to a rechargeable battery including a bare cell having an electrode assembly, a battery can, a cap assembly and a protection circuit board electrically coupled to the bare cell.

2. Discussion of the Background

Rechargeable batteries are advantageous due to their compact size and high capacity. Types of rechargeable batteries nickel metal hydride (Ni—MH) batteries and lithium-ion batteries, such as Lithium-ion polymer batteries.

FIG. 1 is an exploded perspective view illustrating an example of a conventional can type lithium-ion battery. FIG. 2 is a partial perspective view showing a breaker and a lead plate installed on the cap plate of the bare cell before a protection circuit board is assembled with the bare cell.

Referring to FIG. 1 and FIG. 2, the lithium-ion battery may include a bare cell including an electrode assembly, an electrolyte, a battery can, and a cap assembly. The battery may also include a protection circuit board coupled to the bare cell to control voltages or currents during charging and discharging operations.

The electrode assembly 212 may be formed by stacking and winding a positive electrode 213, a separator 214, and a negative electrode 215 in a jelly roll shape. The positive electrode 213, separator 214, and negative electrode 215 may be thin films or plates.

The positive electrode plate 213 may include a positive charge collector made of a highly conductive metallic thin film, such as an aluminum foil, and a positive activation material layer coated on both sides of the positive charge collector. The positive activation material may include a lithium-based oxide material. A positive electrode tap 216 may be electrically coupled to a portion of the positive electrode 213 on which the positive activation material layer is not formed on the positive charge collector.

The negative electrode plate 215 may include a negative charge collector made of a highly conductive metallic thin film, such as a copper foil, and a negative activation material layer coated on both sides of the negative charge collector. The negative activation material may include a carbon-based material. A negative electrode tap 217 may be electrically coupled to a portion of the negative electrode 215 on which the negative activation material layer is not formed on the negative charge collector.

The polarities of the positive and negative electrode plates 213 and 215 may be switched, and polarities of the positive and negative electrode taps 216 and 217 may be also be switched. An insulation tape 218 may be wound around the positive and negative electrode taps 216 and 217 near the areas where the electrode taps 216 and 217 are extracted from the electrode assembly 212 to prevent a short circuit between the two electrodes 213 and 215.

The separator 214 may be made of polyethylene, polypropylene, or a co-polymer of polyethylene and polypropylene. The area of the separator 214 may be larger than the area of the positive and negative electrode plates 213 and 215 to prevent a short circuit between the two electrode plates 213 and 215.

The rectangular can 211 may be made of aluminum or an aluminum alloy and may have a hexahedral shape. The battery can 211 functions as a reservoir for storing the electrode assembly 212 and the electrolyte. The battery can 211 may serve as a terminal itself, or the cap plate of the cap assembly may serve as a positive electrode terminal.

The cap assembly may include a flat cap plate 110 that corresponds to the size and shape of the opening of the battery can 211. A terminal thru-hole 111 may be provided in the center of the cap plate 110. The electrode terminal may extend through the terminal thru-hole 111. A tubular gasket 120 may be arranged around the outer circumferential portion of the electrode terminal 130 between the electrode terminal 130 and the cap plate 110. An insulation plate 140 may be installed on the lower surface of the cap plate 110. The insulation plate 140 may have thru-holes corresponding to the center of the cap plate 110 and the terminal thru-hole 111 of the cap plate 110. A terminal plate 150 may be installed on the lower surface of the insulation plate 140.

The electrode terminal 130 may be inserted into the terminal thru-hole 11 of the cap plate 110. The lower end of the electrode terminal 130 may be electrically coupled to the terminal plate 150 with the insulation plate 140 being interposed between them.

The positive electrode tap 216 may be welded to the lower surface of the cap plate 110. The negative electrode tap 217 may be welded to the lower end of the electrode terminal 130. The negative electrode tap 217 may be folded into a serpentine shape.

An insulation case 190 may be arranged on top of the electrode assembly 212 to cover the top surface of the electrode assembly 212 and provide insulation between the electrode assembly 212 and the cap assembly. The insulation case 190 may be made of a polymer resin, such as polypropylene. A lead thru-hole 191 may be arranged on the insulation case 190 and the negative electrode tap 217 may extend through it. An electrolyte injection hole 192 may be arranged at another side of the insulation case 190. A lead thru-hole for the positive electrode tap 216 may be arranged next to the lead thru-hole 191 for the negative electrode tap 217 at the center of the insulation case 190.

An electrolyte injection hole 112 may be arranged at one side on the cap plate 110. The electrolyte injection hole 112 may be sealed with a plug 160 after the electrolyte is injected into the battery case. The plug 160 may include a ball type member made of aluminum or an aluminum alloy that is forcibly injected into the hole 112. The plug 160 may be welded to the cap plate around the electrolyte injection hole. The plug 160 may be made of a material similar to that of the cap plate 110 for a more robust weld.

The positions of the terminal thru-hole and the electrolyte injection hole of the cap plate, the holes through which the electrode tap is extracted from the electrode assembly, and the shape or the arrangement of the insulation plate or the terminal plate installed on the lower surface of the cap plate may be varied if the position of the electrode terminal is changed.

Contact portions between edges of the cap plate 110 and the side wall of the can 211 may be welded to combine the cap assembly with the can 211. The upper portion of the side wall of the can 211 may be bent inward to form a flange shape above the cap plate 110 after the cap assembly is assembled with the can 211.

A protrusion 310 may be arranged at one side of on the cap plate. The protrusion 310 may be engaged with a holder 320. The holder 320 may have inner diameter sized to fit snuggly onto the protrusion 310 to keep the holder 320 from moving if a horizontal force is applied. The holder 320 may be simply engaged with the protrusion 310, or may be welded to the protrusion 310 for a more robust engagement. If the holder 320 is welded to the protrusion 310, the holder 320 may made of a material similar to that of the protrusion 310.

The holder 320 may have an inner groove on its lower surface or may have an through hole, as shown in FIG. 1. A molding resin may be filled in the remaining space in the through hole to reinforce the holder 320. The holder 320 may be taller than the protrusion 310 to prevent a molding resin from slipping on the protrusion 310 and being separated from the unit cell 110 when a torsion stress is applied to the battery.

A separate conductive tap (not shown) may be installed on the terminal electrode 130 in a manner similar to the engagement between the protrusion 310 and the holder 320. The tap may be vulnerable to torsion stress because it is positioned in the center of the cap plate 110, but may serve as a support against a bending force.

The cap assembly may include a cap plate 110 covering the opening of the can 211, an electrode terminal 130 insulated from the cap plate 110 by a gasket 120, and a lead plate 410 for electrically coupling the bare cell to the protection circuit board 300. A breaker 420, which functions as a battery safety device, may also be included in the cap plate 110. The protection circuit board includes a pair of external terminals 311 and 312, as shown in FIG. 1 and FIG. 2, to connect the battery to a charger or other electronic devices.

One electrode of the electrode assembly 212 may be welded to the terminal plate 150 in the bare cell. The terminal plate 150 may be separated from the lower surface of the cap plate 110 by the insulation plate 140, and electrically coupled to the electrode terminal 130. The electrode terminal 130 may be insulated from the cap plate 110 by the gasket 120. The other electrode of the electrode assembly 212 may be directly welded to a surface of the cap plate 110.

The breaker 420 may be attached to an upper surface of the cap plate 110 and insulated from the cap plate 110 by a two-sided adhesive tape or an insulation tape 330. The electrode terminal 130 may be coupled to one electrical terminal 421 of the breaker 420. The other electrical terminal 423 of the breaker may be coupled to one electrical terminal 370 of the protection circuit board 300. A lead plate 410 may be welded to the cap plate 110 on the opposite side from the breaker 420 across the electrode terminal 130. The lead plate 410 may be coupled to the other electrical terminal 360 of the protection circuit board 300. The breaker 420 may be coupled in serial between the protection circuit board 300 and the electrode terminal 130 of the bare cell, so that a charging and discharging current may flows through the breaker. The breaker 420 may detect heat generated by an abnormality of the charging and discharging current and may shut down the current path.

The breaker 420 may include a bimetal switch. The bimetal switch may then close to resume the current flow when the temperature returns to normal. This type of protection circuit may be dangerous because although the current may be temporarily shut down due to an abnormal condition, the abnormal condition may not be eliminated and may resume when the current resumes so that the rechargeable battery may eventually explode. Positive temperature coefficient (PTC) elements may be used instead of conventional breakers because they cannot be closed again after opening due to an increase in temperature.

If a breaker 420 such as the one shown in FIG. 1 and FIG. 2 is used extra space for the breaker terminals 421 and 423 to couple the breaker 420 and the electrode terminal 130 and the breaker and the electrical terminal 370 of the protection circuit board will be required. The extra space required is counterproductive to the goal of producing a smaller rechargeable battery.

Additionally, an insulation tape or a two-sided adhesive tape 330 may be required to insulate the breaker from the cap plate. This increases the process and manufacturing costs.

SUMMARY OF THE INVENTION

This invention provides a rechargeable battery that includes safety devices with a simplified coupling structure.

Additional features of the invention will be set forth in the description which follows, and in part will be apparent from the description, or may be learned by practice of the invention.

The present invention discloses a rechargeable battery including an electrode assembly including two electrodes and a separator; a can to store the electrode assembly and an electrolyte; a cap assembly including a cap plate to cover an opening of the battery can; a protection circuit board; and a current interruption device, wherein a first terminal of the current interruption device is directly coupled to the cap plate, and a second terminal of the current interruption device is coupled to the protection circuit board, and a second terminal of the protection circuit board is coupled to an electrode terminal of the cap assembly.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
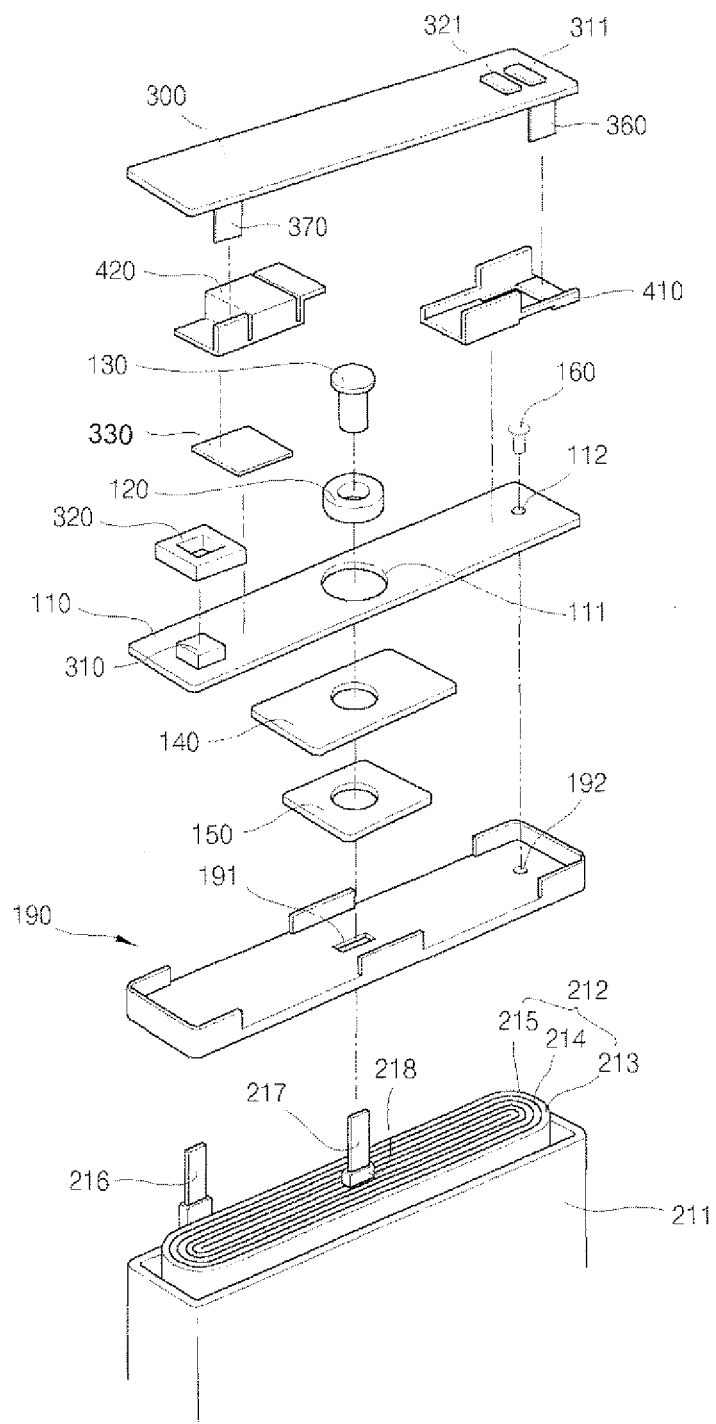
FIG. 1 is an exploded perspective view illustrating a conventional can type lithium-ion battery.
Figure 2:
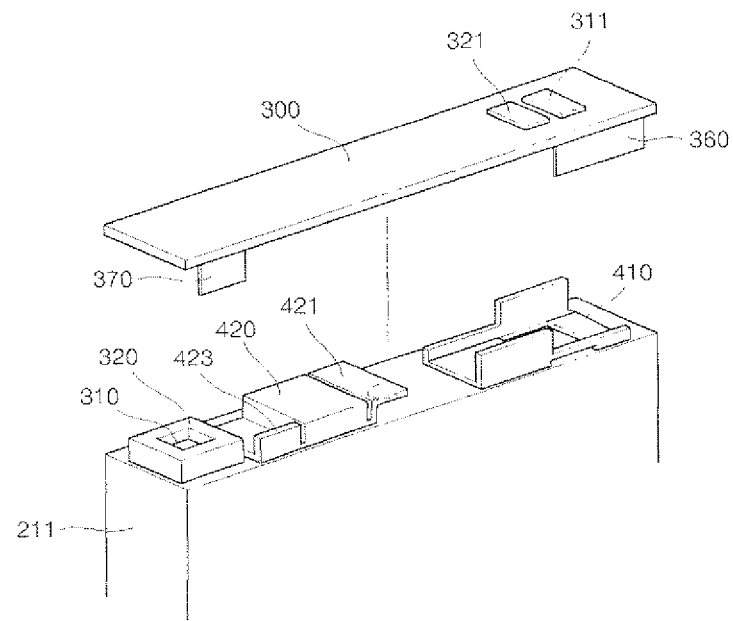
FIG. 2 is a partial perspective view illustrating a breaker and a lead plate installed in the cap plate of the bare cell before the bare cell is assembled with the protection circuit board.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element such as a layer, film, region or substrate is referred to as being "on" another element, it can be directly on the other element or intervening elements may also be present. In contrast, when an element is referred to as being "directly on" another element, there are no intervening elements present.

A current interruption device may be directly coupled to the cap plate of the bare cell without using an insulation tape, a two-sided adhesive tape, or a lead plate. The manufacturing and material cost of these elements may therefore be saved.

Additionally, heat generated by an abnormal condition of the bare cell may be detected more quickly because the current interruption device is directly attached to the cap plate. This may allow the current interruption device to shut down the current more quickly and improve the safety of the rechargeable battery.

Figure 3:
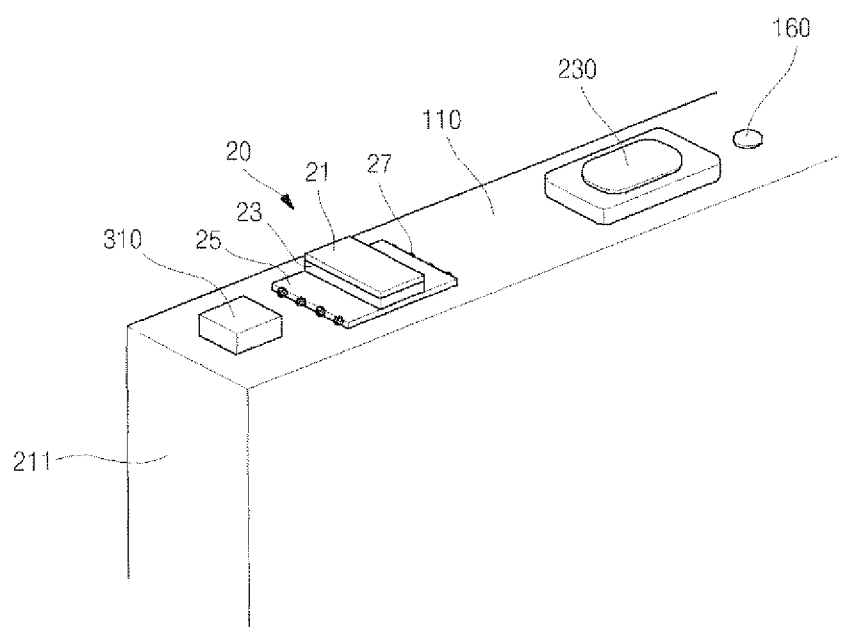
FIG. 3 is a partial perspective view illustrating a PTC element installed on the cap plate of the bare cell according to an exemplary embodiment of the present invention.

FIG. 3 is a partial cross-sectional view illustrating a PTC element installed on the cap plate of the bare cell of a rechargeable battery according to an exemplary embodiment of the present invention.

Referring to FIG. 3, the PTC element 20 may include an upper electrode 21, a lower electrode 25, and a body 23 arranged there between. The body 23 may be made of a thermal detection material. Alternatively, the body 23 may be made of thermally expandable binders and conductive particles mixed in an appropriate ratio. Accordingly, if the surrounding temperature increases, the binders in the body 23 may expand so that the distances between the conductive particles increase and the current is shut down.

The lower electrode 25 may be directly coupled to the cap plate 110 without interposing an insulation material. The lower electrode 25 may be coupled to the cap plate 110 by conductive adhesive or welding. The lower electrode 25 may extend horizontally beyond the body 23 or the upper electrode 21 to form a terminal to be welded at a welding point 27. Laser welding may be used, especially if the cap plate 110 or the lower electrode 25 is made of a material having a low electrical resistance and a high thermal conductivity, such as aluminum.

The upper electrode 21 of the PTC element 20 may have a polarity similar to that of the cap plate 110, and may be coupled to a positive electrode terminal of the protection circuit board (not shown). The upper electrode 21 may be coupled to the positive electrode terminal of the protection circuit board by welding. The upper electrode 21 of the PTC element 20 may be a relatively thick metal plate made of a high thermally resistant material, such as nickel or nickel alloy to protect the body during welding.

The electrode terminal 230 may be arranged in the center of the cap assembly. The electrode terminal 230 may be directly coupled to the negative electrical terminal of the protection circuit board by welding without using a breaker. The entire upper surface or a part of the upper surface of the electrode terminal may be made of nickel.

Figure 4:
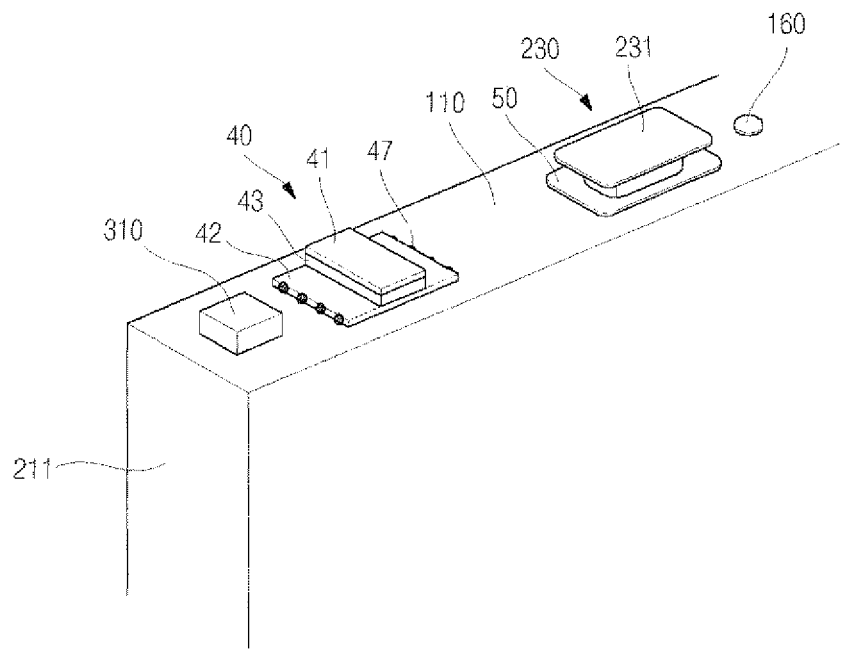
FIG. 4 is a partial perspective view illustrating a rechargeable battery according to an exemplary embodiment of the present invention.
Figure 5:
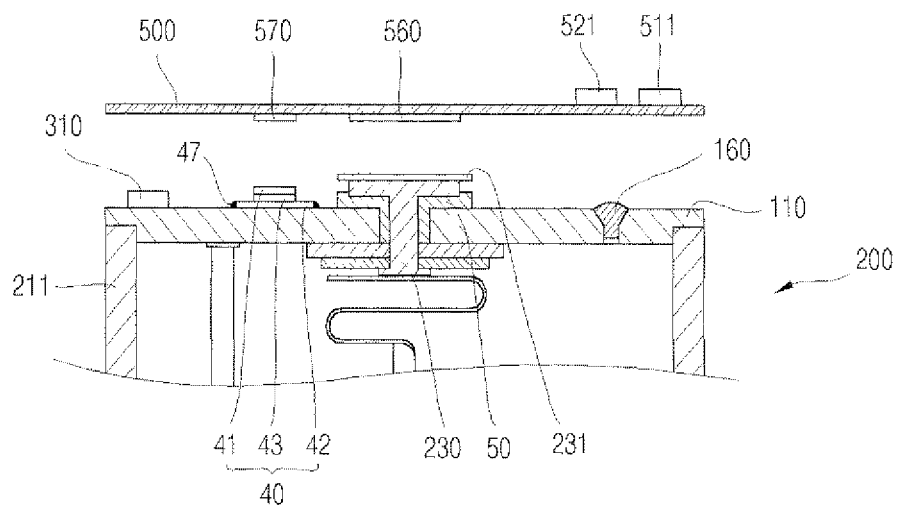
FIG. 5 is a partial cross-sectional view illustrating a structure for assembling the protection circuit board with the bare cell shown in FIG. 4 according to an exemplary embodiment of the present invention.

FIG. 4 is a partial perspective view illustrating a rechargeable battery according to an exemplary embodiment of the present invention. FIG. 5 is a partial cross-sectional view showing a structure for installing a protection circuit board according to an exemplary embodiment of the present invention.

A breaker 40 may be installed on the bare cell. The breaker 40 may include a lower electrode 42, a bimetal portion 43, and an upper electrode 41. The lower electrode 42 may be coupled to the cap plate 110 by conductive adhesive or welding. The lower electrode 42 may extend horizontally beyond the bimetal portion 43 or the upper electrode 41 to form a terminal to be welded at a welding point 47. Laser welding may be used, especially if the cap plate 110 or the lower electrode 42 is made of a material having a low electrical resistance and a high thermal conductivity, such as aluminum. However, a terminal, such as the lead plate used in conventional batteries need not be provided. Additionally, the lower electrode 42 may be directly coupled to the cap plate 110 without using a two-sided adhesive tape to insulate the breaker from the cap plate. The breaker 40 shown in FIG. 4 and FIG. 5 may have an electrical coupling structure similar to the PTC element 20 shown in FIG. 3, but a bimetal portion 43 may be substituted for the body 23 of the PCT element 20. The size of and the materials used in the upper and lower terminals 41 and 42 may be similar to those of the exemplary embodiment shown in FIG. 3. The upper electrode 41 of the breaker 40 may be electrically coupled to an electrical terminal 570 of the protection circuit board 500, and the electrode terminal 230 of the bare cell may be coupled to the other electrical terminal 560 of the protection circuit board 500. If the height of the upper electrode 41 is equal to that of the top surface 231 of the electrode terminal 230, the electrical terminals 560 and 570 of the protection circuit board may be of equal height, to easily achieve coupling. The protection circuit board includes a pair of external terminals 511 and 512, as shown in FIG. 5, to connect the battery to a charger or other electronic devices.

The electrode terminal 230 may be arranged in the center of the cap plate 110 or may be arranged between the center of the cap plate 110 and the end of the cap plate 110 opposite from the breaker 40.

A protrusion 310 and a cap (not shown) attached to the protrusion 310 may be arranged next to the breaker 40 on the cap plate 110. The top surface 231 of the electrode terminal 230 may be wider than other portions of the electrode terminal 230. The wider top surface 231 may be used to weld the protection circuit board 500 to the top surface 231, or may function as a shoulder to provide a robust grip if a hot-melt resin is filled in the space between the bare cell 200 and the protection circuit board 500. A tubular gasket 50 may be arranged around the outer circumferential portion of the electrode terminal 230 between the electrode terminal 230 and the cap plate 110.

The arrangements described above may allow heat generated in the bare cell to be directly transferred to the PCT element 20 or the breaker 40 without passing through an insulation material or a two-sided adhesive tape. Therefore, the breaker 40 or the PCT element 20 may break the circuit more quickly when the battery overheats due to an abnormal condition to improve the safety of the rechargeable battery. To transfer heat more quickly, the lower electrode of the PCT element 20 or the breaker 40 may be a thin plate or film made of a highly conductive material.

The upper electrode of the current interruption device or the current interruption device itself may include a flat horizontal surface to create a convenient welding surface. The terminals of the protection circuit board may also include a flat horizontal surface. It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A rechargeable battery, comprising:
an electrode assembly comprising two electrodes and a separator;
a can to store the electrode assembly and an electrolyte;
a cap assembly comprising a cap plate to cover an opening of the battery can;
a protection circuit board; and
a current interruption device situated between a lower surface of the protection circuit board and an upper surface of the cap plate, the upper surface of the cap plate facing the protection circuit board, the lower surface of the protection circuit board facing the upper surface of the cap plate,
wherein a first terminal of the current interruption device is disposed directly on the upper surface of the cap plate, and a second terminal of the current interruption device is directly coupled to a first terminal of the protection circuit board, and a second terminal of the protection circuit board is directly coupled to an electrode terminal of the cap assembly,
wherein the first terminal of the current interruption device is electrically connected with the cap plate.

2. The rechargeable battery of claim 1, wherein the current interruption device is a positive temperature coefficient element or a bimetal switch type breaker.

3. The rechargeable battery of claim 1, wherein the electrode terminal of the cap assembly is arranged on one side of the center of the cap plate.

4. The rechargeable battery of claim 3, wherein the electrode terminal of the cap assembly is arranged symmetrically to the current interruption device with respect to the center of the cap plate.

5. The rechargeable battery of claim 1, wherein an upper portion of the second terminal of the current interruption device comprises nickel or a nickel alloy, or is coupled to a separate metal plate comprising nickel or a nickel alloy.

6. The rechargeable battery of claim 1, wherein the first terminal of the current interruption device comprises a thermally conductive metal.

7. The rechargeable battery of claim 6, wherein the metal comprises aluminum.

8. The rechargeable battery of claim 1, wherein at least a part of the first terminal of the current interruption device extends horizontally beyond other portions of the current interruption device and is welded to the cap plate.

9. The rechargeable battery of claim 6, wherein at least a part of the first terminal of the current interruption device extends horizontally beyond other portions of the current interruption device and is welded to the cap plate.

10. The rechargeable battery of claim 1, wherein the second terminal of the current interruption device is thicker than the first terminal of the current interruption device.

11. The rechargeable battery of claim 5, wherein the second terminal of the current interruption device is thicker than the first terminal of the current interruption device.

12. The rechargeable battery of claim 1, wherein the first terminal of the current interruption device extends horizontally beyond a body of the current interruption device.

13. The rechargeable battery of claim 1, wherein an upper surface of the first terminal of the current interruption device is wider than a body of the current interruption device.

14. The rechargeable battery of claim 1, wherein a hot-melt resin is arranged between the cap plate and the protection circuit board.

15. The rechargeable battery of claim 1, wherein a protrusion is arranged on a top surface of the cap plate and a cap is engaged with the protrusion.

16. The rechargeable battery of claim 4, wherein a protrusion is arranged on a top surface of the cap plate and a cap is engaged with the protrusion.

* * * * *